3,511,226
LACTOSE MANUFACTURE
Robert Carlton Kyle and Robert John Henderson, Minneapolis, Minn., assignors to Emery Carlton Swanson, Minneapolis, Minn.
Filed Jan. 17, 1968, Ser. No. 698,588
Int. Cl. C13k 5/00; C13f 1/02
U.S. Cl. 127—58                                    9 Claims

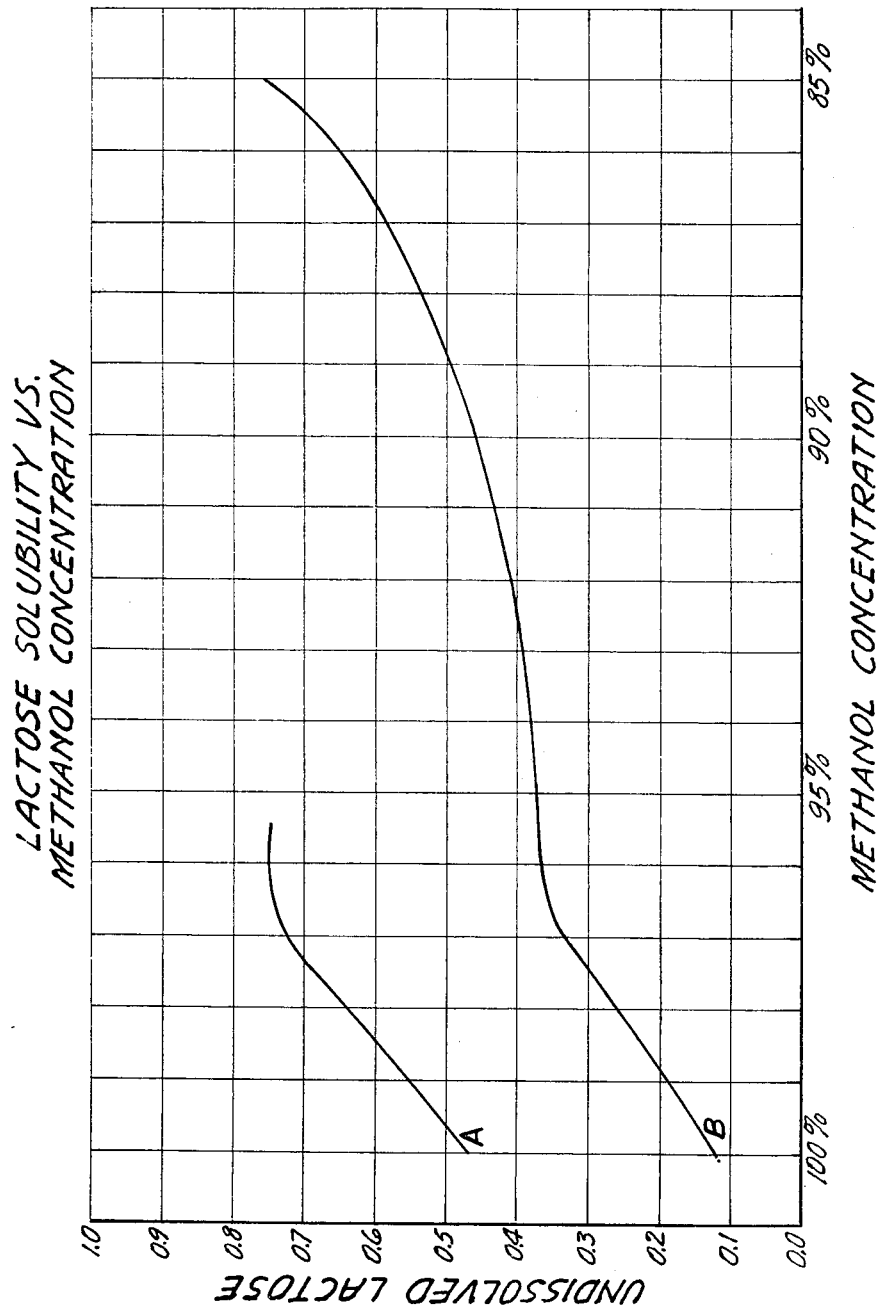

ABSTRACT OF THE DISCLOSURE

Process for the preparation of a highly water soluble lactose powder which comprises (a) dissolving non-delactosed skim milk powder or whey powder in a solvent consisting of methanol having less than 3% water by volume, (b) removing insolubles from the solution, (c) crystallizing the lactose from the solution, (d) separating the wet lactose solids, and (e) drying said wet lactose solids in the absence of moisture.

---

This invention relates to a process for the preparation of lactose from skim milk and whey and to the resulting product. In one aspect this invention relates to a process for the preparation of a high purity lactose which rapidly dissolves in water.

Lactose in highly purified form is useful in the pharmaceutical field and as a nutritional food product. It is found in milk and milk products and is included in whey derived from cheese manufacture. Although considerable research has been directed to the recovery of lactose and protein from whey, the lactose fraction obtained has a relatively low rate of solubility in water and frequently contains a mixture of alpha and beta lactose. In 1938 the separation of lactose and soluble proteins of whey by alcohol extraction was described in Industrial and Engineering Chemistry, volume 30, No. 11, pages 1305–1311 by Abraham Leviton and Alan Leighton. This study of the solvent effect on whey powder of alcoholic solutions of various alcoholic concentrations indicated that lactose can be selectively crystallized from filtered water solutions having at least about 70% alcohol without serious impairment in the water solubility of the whey proteins. Increasing the pH of the filtered mother liquor tends to produce precipitation of the insoluble salts and leads to a reduction in the ash content of the subsequently crystallized lactose. Decreasing the pH of the filtered mother liquor increases the solubility of the nitrogenous material and calcium salts without appreciably affecting the solubility of the lactose. Crystallization of lactose from the filtered and acidified mother liquor therefore tends to reduce the concentration of nitrogen in the crystallized lactose fraction. Stated in another manner, crystallization of lactose from a filtered and acidified mother liquor permits a more effective separation of lactose from the proteinaceous material. These studies also related the effect of alcohol concentration on the solubility of whey proteins, since the insolubilization of water soluble protein is undesirable. An alcohol water solution above 70.7% alcohol was found to be necessary to retain maximum water solubility of the protein, but 95% alcohol solution produced turbidity and apparently increasing insolubilization of the protein fraction at room temperature. When a 95% alcohol solution was used at 60° C. a significant amount of lactose was removed with the insolubles during filtration and a 60% yield of lactose was obtained from the acidified filtrate, this lactose product (a mixture of alpha and beta lactose) being reported to be unusually pure, sweet and soluble. A subsequent article by Mr. Leviton in Industrial and Engineering News, volume 41, No. 7, pages 1351–1357 (1949) extended the original ethanol studies to methanol and to the extraction of lactose and soluble proteins from skim milk. A 62% methanol solution in water was found to yield high quality alpha lactose at −15° C. with higher methanol concentrations causing sharply decreasing lactose yields. At 25° C. methanol solutions from 84.3 to 93.7% proved effective for extraction of lactose from skim milk, and 90% methanol produced yields of lactose (mixture of alpha and beta lactose) as high as 80% after a crystallization period of several hours. In Fundamentals of Dairy Chemistry, B. H. Webb and A. H. Johnson, page 232 (Avi Publishing Co., Westport, Conn., 1965) it is reported that crystals of anhydrous alpha lactose can be crystallized from dry methyl alcohol or absolute ethyl alcohol, the resulting product being quite water soluble but not appreciably hygroscopic.

Although the experiments reported above and the corresponding teachings of U.S. Pats. Nos. 2,116,931 and 2,129,222 describe the feasibility of lactose extraction from whey and skim milk, it has been desirable to find a simple but efficient process for producing lactose in a form having improved water solubility, ie. having a high rate of dissolution in water, since this is an important factor in its various pharmaceutical uses. One object of this invention is therefore to provide such a process. Still another object is to provide a highly water soluble lactose powder in free flowing form.

It has been found that the above and other objects of this invention may be realized by (a) dissolving non-delactosed skim milk powder or whey powder such as is produced by spray drying of skim milk or cheese whey (e.g. cottage cheese or cheddar cheese whey) in alcohol (i.e. methanol or ethanol), most preferably methanol, having less than 3% water by volume, preferably less than 1% water, the usual range of whey solids in grams per 100 cc. of solvent being from 1 to 50, preferably from 5 to 30 (b) removing insolubles, e.g. by filtration, (c) crystallizing the lactose from the solution, (d) separating the wet lactose solids and (e) drying said wet lactose solids in the absence of moisture to provide a high purity, highly water soluble, non-granular, free flowing lactose powder. If more than 3% water is present in the methanol solvent the lactose product has a significantly lower rate of dissolution in water. A methanol solvent with less than 1% by volume of water, particularly 100% methanol, produces the most desirable lactose product. Although the concentration of whey solids in the solvent can be varied over an extremely wide range, the efficiency of the process is reduced at lower whey solids concentrations and the relatively thick or viscous consistency of the solution at higher whey solids concentrations complicates the filtration of insolubles. The temperatures used in the process are not critical, although the yield of lactose product can be affected. Generally, temperatures from 0° C. to 60° C., preferably from 25° C. to 50° C., are most satisfactory. After the filtration step the crystallization of lactose from the filtrate may be preceded by acidification to increase protein solubility, if desired, although prompt crystallization of the lactose after filtration results in excellent selective separation of the lactose from the protein. The crystallization occurs more or less rapidly, depending on the degree of agitation, temperature, etc., and is complete when the crystallized lactose settles leaving a clear supernate, normally after about one hour stirring.

After the lactose crystallization is completed the alcoholic supernate liquid is removed, e.g. by decantation, and the wet lactose is dried in the absence of moisture to remove all remaining liquid, i.e. alcohol solvent. It is very important to dry the lactose in the absence of moisture, since the presence of moisture, even atmospheric moisture, significantly decreases the solubility of the dried lactose product. However, once the lactose is dried, subsequent exposure to moisture no longer appears to be deleterious. Drying the wet lactose under vacuum is one particularly effective technique for this purpose.

The above described steps of lactose crystallization and solvent removal in the absence of moisture may also be effected by rapidly flashing off the solvent, such as in a spray drier, although the powder particles do not have the same shape as those obtained by completing the crystallization before drying.

The figure represents a plot of methanol concentration (remainder being water) versus solubility of the dried lactose product. The whey solids concentration was 10 grams of spray dried whey solids per 100 cc. of solvent. Curve A represents the results obtained with samples which were air dried under ambient conditions. Curve B represents results obtained with samples dried in a vacuum oven at room temperature. Solubility of the dried lactose in water is reported as grams of undissolved lactose after conducting the following solubility test at 25° C. A 1.500 gram sample of dried lactose is placed in a 100 ml. beaker. Distilled water (2.0 ml.) is added, and a 1 minute timer is started the moment the water is added. The solution is stirred steadily for the full one minute, then it is vacuum filtered through a small Buchner funnel (using a No. 1 Whatman filter paper) fitted into a small vacuum flask. The filtrate is returned to the beaker to rinse out any remaining undissolved solids and is again passed through the filter paper. This rinsing procedure is repeated two more times. The filter paper and residue are then vacuum dried on the Buchner funnel for 10 minutes, after which it is removed and allowed to air dry for 30 minutes. The residue weight, i.e. undissolved lactose, is then determined. Curves A and B in the figure show the improvement in solubility achieved with at least 97% methanol and with drying in the absence of moisture, providing a lactose product having less than 0.3 gram of undissolved material per 1.500 grams of sample.

The dried lactose powder obtained from the process of this invention is characterized by a high rate of dissolution in water, high purity, lack of granularity, free flowing properties, white appearance, powdery form, and a sweet taste. It is believed to be in the form of alpha lactose anhydride.

The following will further illustrate the process of this invention.

40 grams of spray dried cottage cheese whey powder (containing 54.2% lactose) were slurried with 400 ml. of 100% methanol and stirred for one minute. The slurry was filtered through a Buchner funnel fitted with a rapid filtration filter paper. Vacuum was applied to the filter apparatus to facilitate separation. The filtrate was then transferred to a 600 ml. beaker. Crystallization occurred in the filtrate after about 45 minutes. This time period can be shortened by agitation of the filtrate, such as by the use of a stirrer, vibrator, etc. The lactose crystals were then separated from the alcoholic mother liquor by filtration and were transferred to a vacuum oven to remove all remaining alcohol. The lactose product was highly water soluble and was notable for its lack of graininess and sweet taste.

Various other embodiments of the present invention will be apparent to those skilled in the art without departing from the scope thereof.

The embodiments of the invention in which an exclusive property or privilege is claimed are defined as follows:

1. A process for the preparation of a highly water soluble lactose powder which comprises
   (a) dissolving non-delactosed skim milk powder or whey powder in a solvent consisting of methanol having less than 3% water by volume,
   (b) removing insolubles from the solution,
   (c) crystallizing the lactose from the solution,
   (d) separating the wet lactose solids, and
   (e) drying said wet lactose solids in the absence of moisture.

2. The process of claim 1 in which said powder is dissolved in said solvent to provide from about 1 to about 50 grams of said powder per 100 cc. of said solvent.

3. The process of claim 1 in which said solvent contains less than 1% water.

4. The process of claim 1 in which said solvent is 100% methanol.

5. The process of claim 1 in which said drying of said wet lactose solids is conducted under vacuum.

6. The process of claim 1 in which the powder in step (a) is a non-delactosed cottage cheese whey.

7. The process of claim 1 in which the powder in step (a) is a non-delactosed cheddar cheese whey.

8. In a process for the crystallization of lactose from a solution of skim milk powder or whey powder in methanol, the improvement which comprises using methanol having less than 3% water by volume and drying the crystallized lactose in the absence of moisture to produce a highly water soluble, non-grainy, free flowing lactose powder.

9. The process of claim 8 in which said methanol solution is a solution of cheese whey powder.

References Cited

UNITED STATES PATENTS

| | | | |
|---|---|---|---|
| 2,116,931 | 5/1938 | Leviton | 127—31 |
| 2,129,222 | 9/1938 | Leviton | 127—31 X |
| 2,460,891 | 2/1949 | Leviton | 127—31 |
| 2,710,808 | 6/1955 | Peebles et al. | 127—31 X |

OTHER REFERENCES

Leviton et al.: "Separation of Lactose . . . by Alcohol Extraction," I & EC, 30:1305–11 (1938).

Leviton et al.: "Extraction of . . . Lactose From Whey Powder With Alcohol," Program of Milk By-Products Conference, U.S. Dept. Agr., Apr. 14, 15, 1938, p. 11.

Webb et al.: "Fundamentals of Dairy Chemistry," Avi Publishing Co., 1965, pp. 238, 248, 249.

Leviton: "Methanol Extraction . . . From Skim Milk Powder," I & EC, 41:1351–7 (1949).

MORRIS O. WOLK, Examiner

D. G. CONLIN, Assistant Examiner

U.S. Cl. X.R.

99—59; 127—31, 42